Nov. 24, 1953     F. K. H. NALLINGER     2,660,424
SPRINGING MECHANISM, ESPECIALLY FOR MOTOR VEHICLES
Filed Jan. 5, 1950

Patented Nov. 24, 1953

2,660,424

UNITED STATES PATENT OFFICE 2,660,424

SPRINGING MECHANISM, ESPECIALLY FOR MOTOR VEHICLES

Friedrich K. H. Nallinger, Stuttgart, Germany, assignor to Daimler-Benz Aktiengesellschaft, Stuttgart-Unterturkheim, Germany Application January 5, 1950, Serial No. 136,865

3 Claims. (Cl. 267—30)

This invention relates to a spring suspension, especially for motor vehicles, and is aimed at suitably supporting the free end of a leaf spring, more particularly of an additional leaf spring, on that part, which is to be sprung from the end of said leaf spring. The special object of the invention is to obtain a better supporting of the leaf spring on an elastic abutment, e. g. a rubber buffer as well as less wear and tear of said buffer. Preferably the invention provides the use of an intermediate lever interposed between said spring and said elastic rubber buffer.

Figure 1:
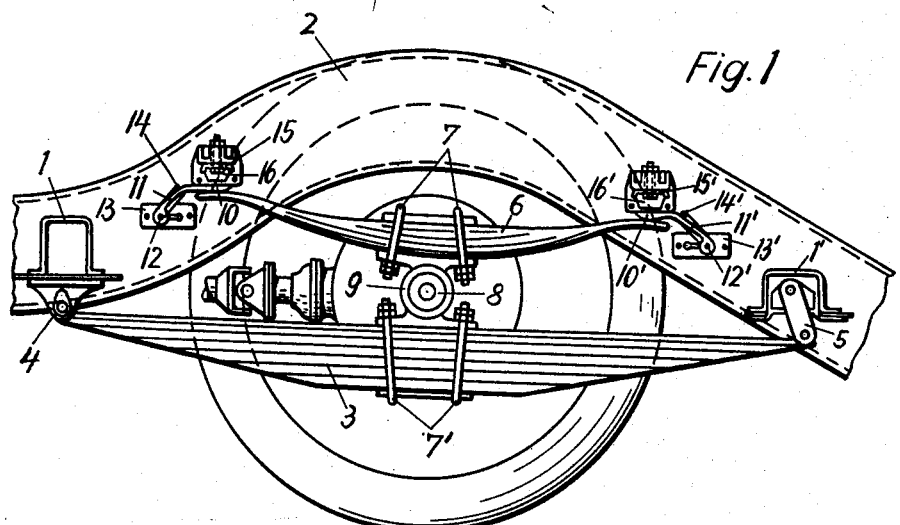
Figure 2:
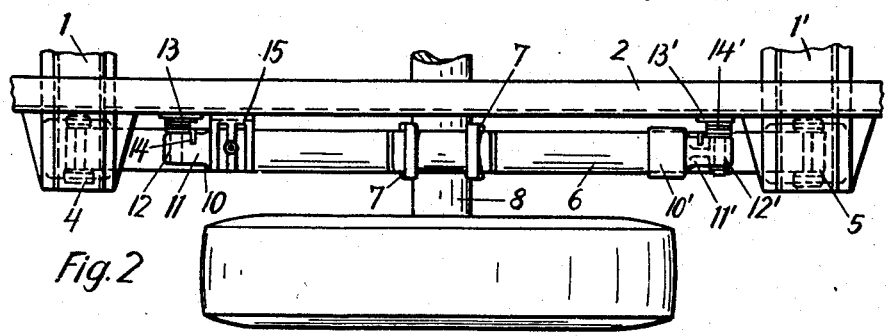
Figure 3:
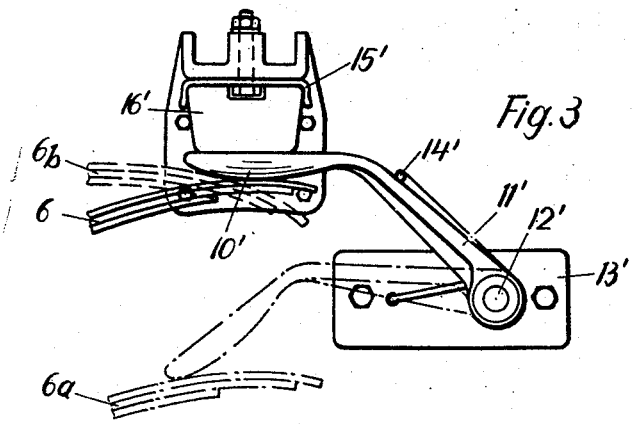

In the drawing which illustrates by way of example the suspension of a vehicle axle involving a springing mechanism according to the invention, Fig. 1 gives a side view of the spring suspension,
Fig. 2 a plan view of same, and
Fig. 3 shows the mechanism for supporting an end of the additional leaf spring with different spring tensions on a scale enlarged as compared with Fig. 1.

In a preferred embodiment, on the transversal girders 1, 1' of a vehicle frame 2 there is suspended in the conventional way a main leaf spring 3 by means of a spring bracket 4 at one end and a spring shackle 5 at the other end. Above the main leaf spring 3 an auxiliary or additional leaf spring 6 is provided.

Both leaf springs (3 and 6) are connected in the conventional way by means of spring bolts 7, 7' to the vehicle axle on an intermediate member 9 surrounding said axle. On each end of the auxiliary leaf spring the ball-shaped end 10, 10' of a lever arm 11, 11' is superposed. Each lever arm is swingable around a gudgeon (12, 12') secured by means of a little bracket (13, 13') to the outer surface of the vehicle's longitudinal girder 2. By the action of springs (14, 14') secured to the brackets (13, 13') the lever ends (10, 10') have continual contact with the ends of the auxiliary leaf spring 6. Above the lever ends 10, 10' elastic stop members, e. g. in the shape of rubber buffers 16, 16' are secured by screws to the vehicle frame 2 in bearings 15, 15' in such a way, that the lever ends 10, 10', when swinging upwards will strike on the rubber buffers 16, 16', as appears from Figures 1 and 3.

Fig. 3 also illustrates how with an increasing tension of the auxiliary spring the ends of said spring will slide along the ball-shaped lower surface of the lever ends 10, 10'. The position as shown by 6a indicates an auxiliary spring end in the case of both main spring and auxiliary spring being unloaded. The lever end 10' remains at a distance from the rubber buffer 16'. The position as indicated by 6 shows an auxiliary spring scarcely loaded, the main spring being at the same time normally loaded. The lever end 10' has just got contact with the rubber buffer 16'. The position as illustrated by 6b corresponds to a highly loaded auxiliary spring with a main spring loaded to maximum.

The device as illustrated presents the advantage that the elastic abutment is merely subject to pressure stress, which will occasion slight wear and tear, the deformation of said elastic abutment being reduced to a minimum amount. The contact will come about softly and with little noise.

This invention is not restricted to the illustrated embodiment.

What I claim is:

1. A spring suspension device for motor vehicle axles comprising in combination a vehicle axle, a main spring suspending a part of the vehicle on the vehicle axle, an auxiliary leaf spring having ends, means connecting the auxiliary leaf spring intermediate the ends thereof to the vehicle axle, leaving the ends free to oscillate in one direction within the limits of the resiliency of the auxiliary spring, resilient bearings positioned on the suspended part to limit oscillation of the ends of the auxiliary spring in the other direction when the main spring is substantially loaded, and intervening levers mounted on the suspended part of the vehicle beyond the ends of the auxiliary leaf spring and having arms interposed between the ends of the auxiliary spring and the resilient bearings and on which the ends of the auxiliary spring bear.

2. A vehicle suspension as in claim 1 wherein the intervening levers are provided with curved lower sides facing the ends of the auxiliary spring.

3. A spring device according to claim 2, wherein the levers are pivotally mounted on the suspended part of the vehicle, and springs operating between the suspended part and the levers urging them into continuous contact with the ends of the auxiliary spring and away from the resilient bearings, so constructed and arranged that the levers are retained against the resilient bearings by the ends of the auxiliary spring against the action of the latter springs.

FRIEDRICH K. H. NALLINGER.

References Cited in the file of this patent

UNITED STATES PATENTS

| Number | Name | Date |
| --- | --- | --- |
| 1,339,779 | Mohler | May 11, 1920 |
| 1,360,135 | Mohler | Nov. 23, 1920 |
| 1,617,031 | Schacht | Feb. 8, 1927 |
| 1,623,845 | Kogstrom | Apr. 5, 1927 |
| 1,956,549 | Carter | May 1, 1934 |
| 2,116,026 | Heuman | May 3, 1938 |
| 2,387,732 | Bailey | Oct. 30, 1945 |

FOREIGN PATENTS

| Number | Country | Date |
| --- | --- | --- |
| 551,825 | Germany | June 4, 1932 |
| 686,743 | Germany | Jan. 15, 1940 |